Feb. 7, 1950     B. E. LUBOSHEZ     2,496,947
FILM PROCESSING MACHINE WITH FILM OPERATED
CONTROL MEANS FOR A FLUID APPLICATOR
Filed Oct. 20, 1945     2 Sheets-Sheet 2
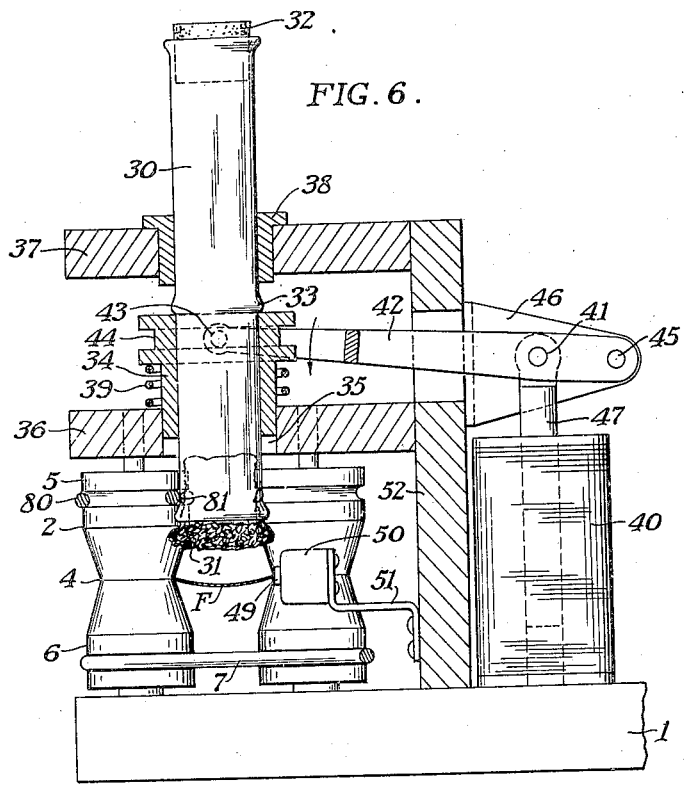
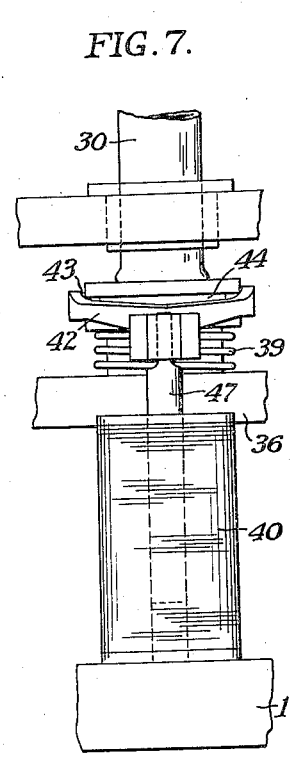
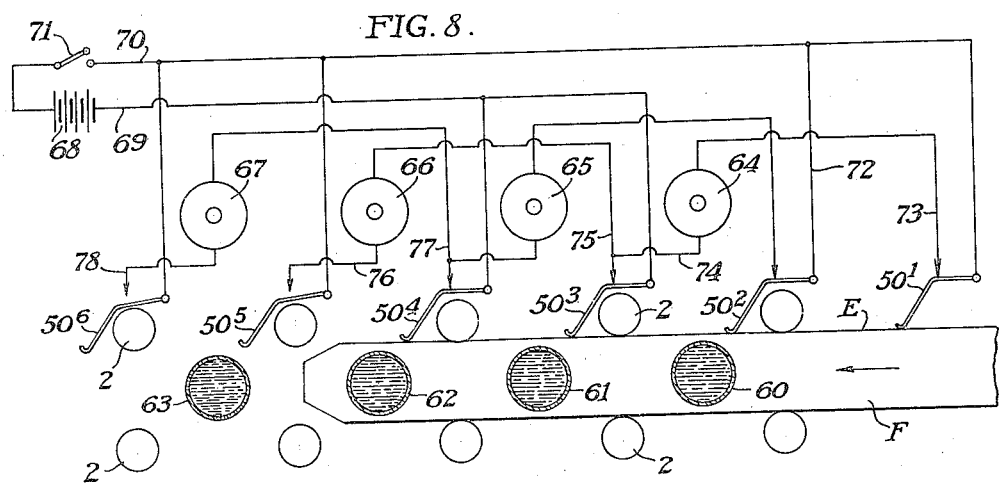
BENJAMIN E. LUBOSHEZ
INVENTOR
BY
ATTORNEYS Patented Feb. 7, 1950

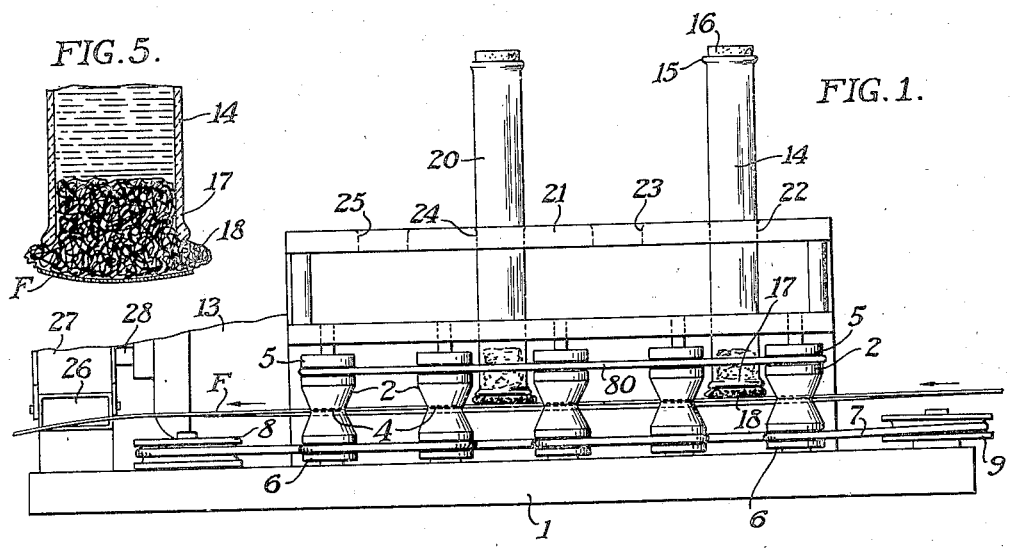

2,496,947

UNITED STATES PATENT OFFICE 2,496,947

FILM PROCESSING MACHINE WITH FILM OPERATED CONTROL MEANS FOR A FLUID APPLICATOR

Benjamin E. Luboshez, Rochester, N. Y., assignor to Eastman Kodak Company, Rochester, N. Y., a corporation of New Jersey Application October 20, 1945, Serial No. 623,541

13 Claims. (Cl. 95—94)

This invention relates to photography and more particularly to photographic film processing machines. One object of my invention is to provide a simple and compact machine through which film of a predetermined width may be passed for continuous or intermittent processing. Another object of my invention is to provide a film processing machine in which processing can be accomplished by subjecting only the emulsion surface, or other surface of a film to be treated, to the treatment solutions. A further object of my invention is to provide a machine in which the treatment fluids can be evenly applied and in which solution applicators can be moved to and from the film. A further object of my invention is to provide a film processing machine in which solution applicators are automatically moved to and from the film and in which the movement of the solution applicators is automatically controlled by the film itself. Other objects will appear from the following application, the novel features being particularly pointed in the claims at the end thereof.

In most processing machines for film of a predetermined width, such as 16-mm., 35-mm., or the like film, it is customary to provide a machine in which the film band passes about a series of rollers through an elongated path passing into and out of the various treatment solutions. Such machines are usually extremely bulky and complicated and since the entire film is usually immersed in the various treatment solutions, it takes an appreciable time to dry film which has been so treated. During the war, high-speed development of film has been accomplished, partially through the use of concentrated solutions and partially through the use of new film treatment solutions, so that film can be developed much more rapidly than heretofore, but the machines for developing the film still have the disadvantage of not only wetting the entire surfaces of a film being fluid treated but, in addition, being large and cumbersome. One of the objects of my invention is to eliminate the necessity of using a large and bulky machine and to provide a machine which will develop, fix, tint, tone, or the like, film by applying the proper solution only to the area of the film which needs to be treated. I also have provided a machine in which relatively short lengths of film can readily be processed if desired. Heretofore, it has been usually difficult, if not impossible, with the standard type of film-developing machines to process relatively short lengths of material with the same machine which may be used for continuous processing of long strips.

Coming now to the drawings wherein like reference characters denote like parts throughout:

Fig. 1 is a side elevation of a film processing machine constructed in accordance with and embodying a preferred form of my invention;

Fig. 2 is a top plan view with parts shown in section of the machine shown in Fig. 1;

Fig. 3 is a transverse section taken on line 3—3 of Fig. 2;

Fig. 4 is a fragmentary enlarged detail showing a preferred means for conducting a film through a fixed path;

Fig. 5 is a detail section showing a portion of a preferred form of solution application;

Fig. 6 is an enlarged fragmentary sectional view through the machine shown in Fig. 1 and through a preferred form of operating mechanism for the solution applicator;

Fig. 7 is a rear view of a portion of the machine shown in Fig. 6; and

Fig. 8 is a circuit which may be used to automatically actuate the solution applicators in accordance with a preferred embodiment of my invention.

My invention comprises broadly moving film through a fixed path preferably by the extreme film edges and applying fluid treatment solutions to the film. I also preferably apply the solutions to a concave surface of the film, although this is not essential, and I preferably automatically control in proper sequential relationship the application of the treatment solution, or solutions, to the film.

More specifically, a preferred embodiment of my invention may comprise a base 1 on which a plurality of pairs of rollers 2 are mounted on pairs of vertical shafts 3. As indicated in Figs. 4 and 6, the pairs of rollers 2 may have a reduced portion 4 of less diameter than the remainder of the roller, and I prefer also to make these rollers of a general "hour-glass" shape. The rollers may have integrally formed thereon pulleys 5 at the top and 6 at the bottom although, of course, these pulleys may be made separately instead of integrally if desired. In order to provide a means for causing a film F to pass through a predetermined path relative to the base 1, I provide a power drive in the form of a belt 7, this belt being looped about the pulley 6 on the various rollers and preferably being passed about the rollers as indicated in Fig. 2. That is, starting with an idler 8 the belt 7 may pass around the lower roller 2, up over the upper roller of the first pair and thence to the next upper roller around the next lower and so on, so that the belt 7 will contact with and drive each of the rollers in the proper direction. After passing from the last roller 2, the belt may pass around a second idler 9 and from this idler it may be looped about a pulley 10 from which it passes to the idler 8. The pulley 10 is carried by a shaft 11 driven by a suitable gear reduction in the housing 12 from a motor 13 carried by the base 1. By selecting a suitable gear reduction in the housing 12, the belt may be driven at any desired speed.

Thus, a film F entering the machine from the right in Fig. 2 may be bowed in cross section, as shown in Fig. 4, and entered between the first pair of rollers 2. Since the spacing of the reduced portions 4 of the rollers is somewhat less than the total width of the film F, the film is maintained curved in cross section as it passes through the machine, this being an advantage since it tends to hold the film straight since it tends to hold the edges of the film comparatively rigid and since it tends to confine the above applied solution to the side against which the solution applicators may rest.

While in the preferred form of my invention I have only shown two applicators in the first six figures, it is obvious that any number may be arranged as required. In Fig. 1 the applicator 14 is typical, this applicator consisting of a cylindrical body, preferably of glass, having an open top 15 which may be closed by a cork 16, and an open bottom 17 in which a wick, sponge, or the like, 18, is attached so that solution contained in the tubular member 14 may be applied to the upper surface of the film F as it passes beneath the applicator. If desired, an air vent may be provided in the cork 16 but I have found that usually solution can be applied evenly by permitting the applicator 18 to extend somewhat below the bottom of the tube 14 as shown in Fig. 5. In the present embodiment the applicator 14 applies a developing solution which is preferably of a concentrated type, and I may provide, by a second applicator 20, a fixing or stabilizing solution to prevent further development.

As will be seen from Fig. 1, the solution applicators 14 and 20 may be carried by a rack 21, having a series of apertures 22, 23, 24, and 25, for placing the solution applicators in the desired positions. As also indicated in Figs. 1 and 2, it will be noticed that there is room between the pairs of rollers for these applicators so that they may contact with the film between any of the pairs of the rollers.

From the solution applicators, the film F is propelled through its fixed path and past a nozzle 26 at which station air from a blower 27 is blown upon the film to dry it, this blower being operated through the shaft 28 of motor 13. It is possible with this machine to develop and fix and dry a film in a very few minutes while the film is continuously moving and very short lengths of film can readily be processed with this machine if desired, although it is primarily intended for developing relatively long lengths of film as from three feet to any number of feet. In the form of my invention, shown in the first two figures, the solution applicators may be placed in the rack 21 by hand and may be allowed to rest with the applicating wick 18 in contact with the film and they may be raised by hand at the end of the processing if desired. I have, however, an automatic device which I prefer to use and which is shown in Figs. 6 to 8 inclusive. In these figures the solution applicator is shown as being capable of movement to and from the film and these movements are entirely controlled through movement of the film through its path. The operation is thus completely automatic. The means for conducting the film F through its path can conveniently be that shown in Fig. 1 and the applicator may be an open ended tube 30 having a wick, sponge, or the like, 31, at its lower end and a closure 32 at its upper end. This applicator is generally cylindrical in form and I preferably provide an enlarged portion 33 so that the applicator may be carried by a slidable bushing 34 movable in a bearing 35 carried by the lower bracket 36. An upper bracket 37 carries a bearing 38 in which the applicator may slide and a spring 39 normally tends to raise the wick 31 from the film. This movement, however, may be overcome by a solenoid 40 which is pivoted at 41 to an arm 42 having a fork arm 43 engaging the groove 44 of the member 34. Arm 42 is pivoted at 45 to a bracket 46 so that when energized the plunger 47 of the solenoid draws the arm downwardly and into contact with the film. As soon as the solenoid is de-energized, spring 39 raises the applicator 30 so that the wick 31 no longer contacts with film.

As above described, the film F is normally held in a position in which it is curved in cross section and when so held it is relatively rigid. Thus, an edge E of the film passes through a fixed path in which path it is adapted to operate an operating arm 49 of a switch 50 which may be of the well known "micro-switch" type in which the operating arm 49 is spring pressed outwardly to open the switch and in which pressure upon this arm 49 closes the switch through only a relatively short movement. The micro-switches 50 may be carried by suitable brackets 51 from the uprights 52 carried by the base 1.

There is a series of these micro-switches, as shown in Fig. 8, as $50^1$, $50^2$, $50^3$, $50^4$, $50^5$, $50^6$, these switches being arranged as indicated in Fig. 8 with the first four of these switches being shown in a closed position and the last two of these switches being shown in an open position. Obviously, the film F in passing through its path as defined by the rollers 2 will operate these switches one after the other.

I have also in this view shown four applicators, 60, 61, 62, and 63, arranged in a row, each one of these being carried by a mechanism shown in Fig. 6. In Fig. 8 there are accordingly four solenoids for operating the applicators 64, 65, 66, 67. A source of power 68 is connected in a circuit comprising the wires 69 and 70, a switch 71 preferably opening and closing this circuit. Wire 70 leads to one side of the switch $50^1$ and a branch 72 leads to one side of switch $50^2$. Wire 69 leads to one side of each of the switches $50^3$, $50^4$, $50^5$, $50^6$. The second terminal of switch $50^1$ is connected to wire 73 which is attached to one terminal of the solenoid 64, the opposite terminal of this solenoid being connected to a wire 74 attached to a wire 75 passing to the second terminal of switch $50^3$, and attached to one terminal of the solenoid 66. The opposite terminal of this solenoid is connected to a wire 76 which goes to the second terminal of switch $50^5$. The switch $50^4$ is connected by a wire 77 to the solenoid 65 and to one terminal of the solenoid 67, the opposite terminal of which is connected by a wire 78 to a terminal for switch $50^6$.

The arrangement of this circuit is such that current flows through the solenoid 64 only when the film presses against switches 50¹ and 50³ and when this occurs, this solenoid 64 will operate to lower the solution applicator 60 against the film. If either switch 50¹ or 50³ should open, then the solenoid 40 will be de-energized and the spring 39 will raise the applicator from the film. Thus, the applicator raises from the film automatically as the end of the film reaches the first switch 50¹. Just as solenoid 64 is controlled by switches 50¹ and 50³, solenoid 65 is controlled by switches 50² and 50⁴. Solenoid 66 is controlled by switches 50³ and 50⁵, and solenoid 67 will be controlled by switches 50⁴ and 50⁶. In each instance when a film starts to pass through its path, it will contact with the first switch 50¹, closing this switch. Next, it will contact with the second switch and so on so that as the pair of switches controlling the particular solution applicators are closed, their respective solenoids will pull down the applicators so that the wicks will apply solution to film. Obviously, any number of these applicators can be arranged along the path of the film to accomplish the desired number of applications to the film. As the film F passes through its path and as the end of the film passes the first switch 50¹, the first applicator 60 will rise from the film under the impulse of its spring 39 and the successive applicators will be released in the same manner.

This automatic control of the applicators, so that each applicator will remain on the film the required length of time, is important because it permits an operator, by controlling the speed of the film and the strength of the solutions carried by the applicators, to accurately control the development, fixing, tinting, toning, and the like, of film. My apparatus is particularly desirable in cases where odd lengths of film, or long lengths of film, are to be developed and, particularly, where high speed of operation is desired. For many war purposes it has been desirable to rapidly photograph certain objects and rapidly process the film and my apparatus, as above described, accomplishes these purposes satisfactorily and, in addition, is satisfactory for use with ordinary commercial photography such as photographing documents where it is desirable to quickly process film showing certain documents or short lengths of film. In Fig. 1 the machine is shown as being equipped with applicators for developing fluid and fixing fluid after which the film is dried. With the normal types of processing fluids, it is customary to wash films, but with some of the newer types of processing fluids, washing is not required or, at least, it is not required immediately, so that if the film is to form a temporary record, the washing step may be entirely eliminated or this step may be given separately at some other time. In any event, my machine is particularly desirable for rapid processing because it only applies to the film the minimum fluid required for the particular operation and the film base and film backing (if any) are not subjected to a prolonged soaking which, of course, requires greater drying time.

I also provide a means for moving the applicator while it is in contact with the film. This, while not necessary, is desirable as it eliminates uneven development which may occasionally otherwise occur. If movement is desired, pulleys 5 may be provided with belts 80, preferably of resilient material to contact with portions 81 of the applicators, turning the applicators to cause the wicks or sponges 18 or 31 to move on the film F.

I have described several embodiments of my invention which are preferred embodiments and it is obvious that variations for special purposes will readily suggest themselves to those skilled in the art. I consider as within the scope of my invention all such variations as may come within the scope of the appended claims.

I claim:

1. A film processing machine comprising a base, a plurality of pairs of spaced rollers mounted on shafts, each roller having a reduced portion for engaging film edges of less diameter than the remaining portions thereof and each pair of rollers being so spaced that a film passing between the rollers may be bowed transversely and guided through contact with the reduced portions of the rollers, means for driving the rollers to pass a film through a path at right angles to the roller shafts defined by the reduced portions of the rollers with the edges of the film in frictional contact with the reduced portions of the rollers, and means between certain of the rollers for applying a film treatment fluid to an area of the film supported by the reduced portions of the rollers and passing between said rollers.

2. A film processing machine comprising a base, a plurality of pairs of spaced rollers mounted on shafts, each roller having a reduced portion for engaging the lateral edge of a film of less diameter than the remaining portions thereof and each pair of rollers being so spaced that a film passing between the rollers may be bowed transversely and guided through contact with the reduced portions of the rollers, means for driving the rollers to pass a film through a path defined by the reduced portions of the rollers with the edges of the film in frictional contact with the reduced portions of the rollers and the film lying transversely of the roller shafts, and treatment fluid containers having a wick for applying the treatment fluid to a surface of a film passing between and supported solely by the rollers.

3. A film processing machine comprising a base, a plurality of pairs of spaced rollers mounted on parallel shafts extending upwardly therefrom, each roller having a reduced portion for engaging the lateral edge of a film and of less diameter than the remaining portions thereof and each pair of rollers being so spaced that a film passing between the rollers at right angles to the shafts may be bowed transversely and guided through contact with the reduced portions of the rollers, means for driving the rollers to pass a film through a path defined by the rollers with the edges of the film in frictional contact with the reduced portions of the rollers, fluid treatment containers and wicks for applying treatment fluid to a film passing between and solely supported by said rollers, and means for turning the wicks against the film as the film moves through the rollers.

4. A film processing machine comprising a base, a plurality of pairs of spaced rollers mounted on parallel shafts, each roller having a reduced portion for engaging the lateral edge of a film and of less diameter than the remaining portions thereof and each pair of rollers being so spaced that a film passing between the rollers at right angles to the shafts may be bowed transversely and guided through contact with the reduced portions of the rollers, means for driving the rollers to pass a film through a path defined by the rollers and at right angles to the shafts with the edges of the film in frictional contact with the reduced portions of the rollers, and means between certain of the rollers for applying a film treatment fluid to an area of the film solely supported by the rollers and passing between said rollers, and comprising a rotatable wick carrying container, and means for driving the rotatable wick carrying container.

5. A film processing machine comprising a base, a plurality of pairs of spaced rollers, parallel vertical shafts supporting the rollers, each roller having a reduced portion for engaging the lateral edge of a film of less diameter than the remaining portions thereof and each pair of rollers being so spaced that a film passing between the rollers horizontally may be bowed transversely and guided through contact with the reduced portions of the rollers, means for driving the rollers to pass a film through a path defined by the rollers with the edges of the film in frictional contact with the reduced portions of the rollers, and means between certain of the rollers for applying a film treatment fluid to an area of the film solely supported by the rollers and passing between said rollers, said means comprising a rotatably mounted wick carrying container and a belt and motor drive to rotate said wick and its carrying container to apply fluid to one side only of the film.

6. A film processing machine comprising a base, rotatable means engaging the film edges at intervals for guiding the film in transversely curved condition across the base and through a path, a solution applicator mounted to move to and from the film path to apply solution to the transversely-curved film on the concave side thereof, and means operable by the film guided through its path for moving the solution applicator into and out of contact with the film.

7. For use in photographic apparatus, a film guiding and supporting mechanism for film of a predetermined width comprising a plurality of rollers arranged vertically in pairs, each roller including a recessed area, each pair of rollers having said recessed areas spaced a distance less than the predetermined width of film to be guided horizontally thereby, whereby said pair of rollers through their recessed areas may engage film solely by the edges thereof maintaining the film between the pairs of rollers in a position in which the film is curved in cross section, said pairs of rollers being spaced apart a distance to receive a fluid applying mechanism, means for moving the fluid-applying mechanism into contact with the film to apply fluid to the concave side of said film positioned by the rollers.

8. A film processing machine comprising a base, pairs of rollers including recessed areas spaced apart less than the film width for engaging and transversely curving a film and for guiding film by its lateral edges through a path at right angles to the rollers, a plurality of solution applying devices mounted for movement into and out of contact with a curved surface of the film passing through its path at a position between said pairs of rollers, and means under the control of film passing through its path for moving the solution applying devices into and out of contact with the surface of the film to fluid treat the film surface.

9. A film processing machine comprising a base, pairs of rollers having recessed areas spaced apart a distance less than the width of the film for engaging and transversely curving the film and for guiding film by its lateral edges through a path at right angles to the rollers, a plurality of solution applying devices mounted for movement into and out of contact with a surface of the film passing through its path, a spring for moving the solution applying device in one direction, a solenoid for moving the solution applying device in an opposite direction, a switch, a movable switch operating arm, a circuit connecting the switch and solenoid, said switch operating arm lying in the path of the film, and being operable by the film passing through its path for moving the switch arm to close the switch controlling the movement of the solution applying device relative thereto.

10. A film processing machine comprising a base, pairs of rollers having recessed areas spaced apart a distance less than the width of the film for transversely curving the film and for guiding film by its lateral edges through a path at right angles to the rollers, a plurality of solution applying devices mounted for movement into and out of contact with a surface of the film passing through its path, a spring for moving the solution applying device in one direction, a solenoid for moving the solution applying device in an opposite direction, a pair of spaced switches, each switch having a movable switch arm lying in the path of the film and movable thereby for closing the switch, a circuit connecting said switches and solenoid and arranged to make the solenoid circuit when both switches are closed, and to open the circuit when one switch is open, said spring moving the solution applicator in one direction when the solenoid is de-energized, said switches lying in the path of the film being operable thereby to move the solution applicating device into contact with the film applying solution to the film when the film makes the solenoid circuit by closing the switches, the spring moving the solution applicator in an opposite direction when the solenoid circuit is broken by the film passing and releasing a switch.

11. The film processing machine called for in claim 10 characterized by said switches being spring pressed open, but capable of being closed by pressure on a switch operating member by a film.

12. The film processing machine called for in claim 10 characterized by said switch arms being spring pressed open, but capable of being closed by pressure on a switch arm by the film, whereby the switch may be operated by an edge of the film.

13. A film processing machine comprising a base, pairs of rollers having reduced areas spaced apart a distance less than the width of the film for curving the film and for guiding a film through a path across the base, a solution applicator mounted for movement on the base into and out of contact with the concaved surface of the film moving through its path, and automatic mechanism under the control of a film passing through its path for moving the applicator into and out of contact with the film for processing the film held by its edges in a curved position as it passes through its path.

BENJAMIN E. LUBOSHEZ.

REFERENCES CITED

The following references are of record in the file of this patent:

UNITED STATES PATENTS

| Number | Name | Date |
|---|---|---|
| 1,437,895 | Horst | Dec. 5, 1922 |
| 1,591,436 | Salins | July 6, 1926 |
| 1,615,047 | Shaw | Jan. 18, 1927 |

(Other references on following page)

UNITED STATES PATENTS

| Number | Name | Date |
|---|---|---|
| 1,622,336 | Moon | Mar. 29, 1927 |
| 1,727,209 | Lentz | Sept. 3, 1929 |
| 1,750,396 | Evans et al. | Mar. 11, 1930 |
| 1,767,442 | Evans et al. | June 24, 1930 |
| 1,924,994 | Knapp | Aug. 29, 1933 |
| 1,928,235 | Taylor | Sept. 26, 1933 |
| 1,964,257 | Gilmore | June 26, 1934 |
| 1,966,684 | Pollock | July 17, 1934 |
| 2,048,754 | Putnam | July 28, 1936 |
| 2,096,231 | Ensign et al. | Oct. 19, 1937 |
| 2,097,059 | Ensign et al. | Oct. 26, 1937 |

FOREIGN PATENTS

| Number | Country | Date |
|---|---|---|
| 609,072 | France | May 3, 1926 |
| 642,376 | Germany | Mar. 2, 1937 |
| 859,361 | France | June 3, 1940 |